(12) United States Patent
Klein

(10) Patent No.: US 8,856,754 B2
(45) Date of Patent: Oct. 7, 2014

(54) SYSTEMS AND METHODS FOR ENHANCED PROFILING OF COMPUTER APPLICATIONS

(75) Inventor: Udo Klein, Maximiliansau (DE)

(73) Assignee: SAP AG, Walldorf (DE)

( * ) Notice: Subject to any disclaimer, the term of this patent is extended or adjusted under 35 U.S.C. 154(b) by 1230 days.

(21) Appl. No.: 12/314,692

(22) Filed: Dec. 15, 2008

(65) Prior Publication Data

US 2010/0153925 A1  Jun. 17, 2010

(51) Int. Cl.
*G06F 9/44* (2006.01)
*G06F 11/34* (2006.01)

(52) U.S. Cl.
CPC ........ *G06F 11/3476* (2013.01); *G06F 11/3419* (2013.01); *G06F 2201/81* (2013.01); *G06F 11/3409* (2013.01); *G06F 2201/88* (2013.01)
USPC ......................................................... 717/127

(58) Field of Classification Search
None
See application file for complete search history.

(56) References Cited

U.S. PATENT DOCUMENTS

| | | | |
|---|---|---|---|
| 6,725,454 B1 * | 4/2004 | Nagel et al. ................... | 718/100 |
| 2003/0196136 A1 * | 10/2003 | Haynes et al. ................... | 714/13 |
| 2005/0071822 A1 * | 3/2005 | DeWitt et al. ................. | 717/131 |
| 2005/0183074 A1 * | 8/2005 | Alexander et al. ............ | 717/144 |
| 2007/0143765 A1 * | 6/2007 | Aridor et al. .................. | 718/104 |
| 2007/0234240 A1 * | 10/2007 | Entin et al. ........................ | 716/1 |
| 2008/0101232 A1 * | 5/2008 | Archer et al. ................. | 370/235 |

FOREIGN PATENT DOCUMENTS

WO   WO 0075814   12/2000

OTHER PUBLICATIONS

European Search Report mailed Oct. 6, 2009 in corresponding EP Application No. 09006849.5 (8 pages).
Langley et al., "Heuristics for Empirical Discovery," published in book "Readings in Machine Learning," Morgan Kaufmann Publishers, 1990, pp. 356-372 (17 pages).
Langley et al., "Data-Driven Approaches to Empirical Discovery," Artificial Intelligence, 40: 283-312, 1989 (30 pages).

* cited by examiner

*Primary Examiner* — Li B Zhen
*Assistant Examiner* — Lenin Paulino
(74) *Attorney, Agent, or Firm* — Finnegan, Henderson, Farabow, Garrett & Dunner, LLP

(57) ABSTRACT

Systems, methods, and computer-readable media are disclosed for enhanced profiling. An exemplary method includes initiating an execution of a software application which includes a plurality of routines, storing information related to data inputs to the plurality of routines during the execution of the software application, storing resource consumption information for the plurality of routines during the execution of the software application, correlating the resource consumption information for the plurality of routines to a size of the data inputs, and analyzing the correlated resource consumption information to determine a subset of the plurality of routines that exhibit at least a threshold amount of resource consumption with increasing size of the data inputs.

17 Claims, 7 Drawing Sheets

| | stack usage | runtime | network bandwidth | heap usage |
|---|---|---|---|---|
| n^3 | *sub17* | *sub19* | *sub19* | *sub7* |
| | *sub14* | *sub12* | *sub14* | *sub17* |
| n^2 | *sub1* | *sub2* | sub11 | sub9 |
| | *sub12* | *sub9* | sub9 | sub8 |
| n (log n)^2 | sub15 | sub16 | sub12 | sub11 |
| | | sub11 | | |
| n log n | sub2 | sub4 | sub4 | sub10 |
| n | sub3 | sub1 | sub5 | sub5 |
| | | | | |

FIG. 7

SYSTEMS AND METHODS FOR ENHANCED PROFILING OF COMPUTER APPLICATIONS

TECHNICAL FIELD

The present invention generally relates to systems and methods for profiling of computer software applications using a profiler.

BACKGROUND INFORMATION

Software applications often need to meet certain resource constraints. For example, a given application may have a time constraint, such as calculating a return value in a set amount of time. The same application may also have to meet a memory constraint, such as using less than a set amount of random access memory to calculate the value. Network bandwidth and latency, storage capacity, and responsiveness to user commands can also impose resource constraints on software.

When developing a software application, software engineers may use a number of techniques to ensure the application meets all of the resource constraints. For example, software engineers may simply provide test cases for a wide variety of circumstances, and execute each test case to see whether the application can meet the resource constraints. However, this approach tends to yield only "pass/fail" results, and therefore may provide only limited visibility into the resource efficiency of the application.

More sophisticated tools are available for software engineers to analyze the resource consumption of an application. These tools are generally called "profilers," and fall into two broad categories. "Event-based" profilers monitor predefined events in a software application, such as calls to routines, and provide resource consumption statistics for each event. "Statistical" profilers sample the execution of an application over a given execution, and compile statistics from the samples to provide resource consumption statistics for the sampled execution.

One type of event-based profilers are "graph" profilers, which provide resource consumption information in a "call tree." The call tree is usually a nested list of routines, which allows a software engineer to view the progression of calls from high-level routines down to more specific routines in an application. The call tree may also provide aggregate runtimes, memory consumption, and other resource metrics for each routine.

Using a call tree, a software engineer can focus on particularly resource-intensive routines in an application. Thus, the software engineer can make changes to make the more resource-intensive routines more efficient. By improving the efficiency of the routines in an application, the software engineer can reduce the overall resource consumption of the application.

However, there are several problems that are unsolved by existing profilers. First, existing profilers tend to point software developers towards the routines in an application that use the most resources. However, these routines are not necessarily inefficient—they may be well-written but resource-intensive routines that are not susceptible to more efficient implementations. Thus, existing profilers are over inclusive in the sense that they may lead software engineers to spend effort trying to improve routines that may already be quite efficient.

Second, in a given profiled execution of an application, inefficient routines will not necessarily constitute a large percentage of the resource consumption. This is because the test case used to generate the profile may present the inefficient routines with input sizes that do not cause the inefficient routines to exhibit their inefficient behavior. Thus, an inefficient routine will consume a relatively small percentage of the resources in test case used to generate the profile, but may actually consume quite a large amount of resources under a different test case or in actual use. In this sense, existing profilers are underinclusive in that they do not lead software engineers to consider improving inefficient routines unless the test case used to generate the profile causes the inefficient routine to constitute a relatively large portion of the application's resource consumption.

Another problem with existing profilers is that inefficient routines can be "buried" in a large profile. For example, an application may run for a relatively long time, perhaps a few hours, and the entire time a profiler may be storing information about the resource consumption of the application. In order to accurately profile such a long execution, a tremendous amount of data will need to be stored during the execution. Thus, it can be difficult for a software engineer to find exactly where in the profile any inefficient routines have used too much of a particular resource.

Thus, it is desirable to provide software engineers with an enhanced profiler that identifies inefficient routines in a software application, even if the inefficient routines do not account for a large portion of the application's resource consumption.

SUMMARY

Consistent with the invention, there is provided methods, systems, and computer-readable media for enhanced profiling. The method may include initiating an execution of a software application which includes a plurality of routines, storing information related to data inputs to the plurality of routines during the execution of the software application, storing resource consumption information for the plurality of routines during the execution of the software application, correlating the resource consumption information for the plurality of routines to a size of the data inputs, and analyzing the correlated resource consumption information to determine a subset of the plurality of routines that exhibit at least a threshold amount of resource consumption with increasing size of the data inputs.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 7 illustrates an additional exemplary user interface for a profiling system, consistent with certain aspects of the invention.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
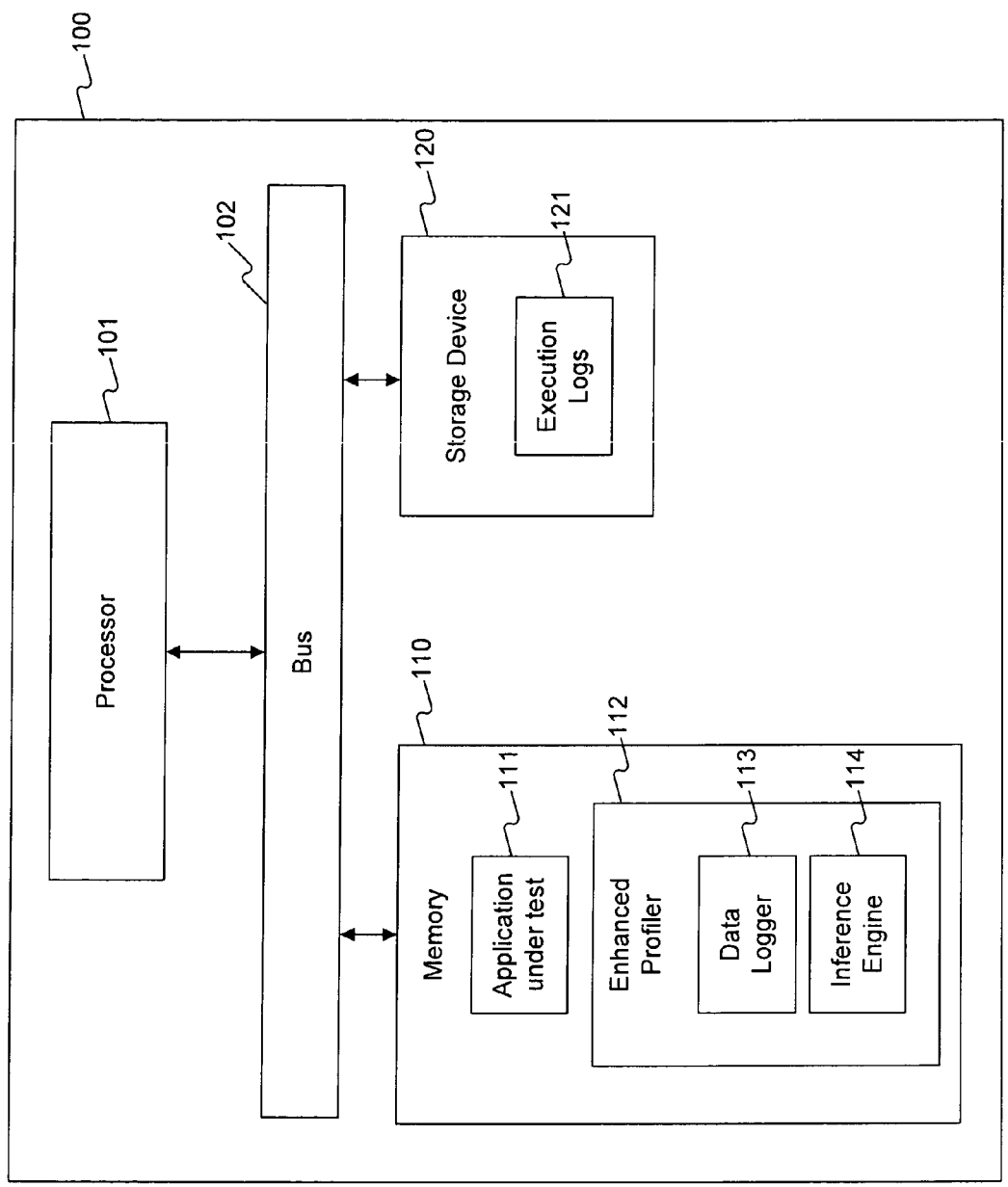
FIG. 1 is a block diagram of an exemplary profiling system, consistent with an embodiment of the invention.

FIG. 1 illustrates a block diagram of an exemplary profiling terminal 100. Profiling terminal 100 may be a general-purpose computer including a processor 101 connected to a bus 102. Using bus 102, processor 101 may communicate with and control a memory 110 and a storage device 120. Memory 110 may include software such as an application under test 111 and an enhanced profiler 112. Enhanced profiler 112 may include software components such as a data logger 113 and an inference engine 114. Data logger 113 may store execution logs 121 on storage device 120, and inference engine 114 may retrieve execution logs 121 from storage device 120.

Profiling terminal 100 may include any number of various hardware and software components. For example, memory 110 may be a conventional RAM, but any suitable volatile or non-volatile memory device may used in place of RAM, such as flash memory, ROM, a cache memory on processor 101, etc. Similarly, storage device 120 may be a conventional hard drive, but any suitable storage device such as a tape drive, optical disk, or optical disk may be used. In some embodiments, storage device 120 may also be a RAM, flash memory, ROM, or a cache memory on processor 101. In preferred embodiments, however, storage device 120 is non-volatile storage. In some embodiments, storage device 120 and memory 110 are implemented using the same physical memory device.

Although FIG. 1 shows a particular number and arrangement of components, other arrangements and numbers of components could be used to implement embodiments of the invention. For example, the various components could be arranged in distributed fashion on a plurality of terminals connected by an electronic computing network. For example, application under test 111 and data logger 113 may operate together on a first terminal to generate execution logs 121. Execution logs 121 could then be sent to a second terminal that includes inference engine 114 for analysis of execution logs 121. Other distributed arrangements consistent with the invention may be implemented by arranging for various terminals to implement certain portions of the processing disclosed herein.

The term "routine" is used herein to refer to a constituent part of a software application. For the purposes of this disclosure, the term routine encompasses the meanings to those skilled in the art of the related terms "method," "procedure," and "function." Further, the term "function" as used herein does not necessarily refer to part of a software program. Rather, the term is used to refer to a mathematical formula describing the efficiency of a software routine, particularly with respect to usage of certain computer resources.

Figure 2:
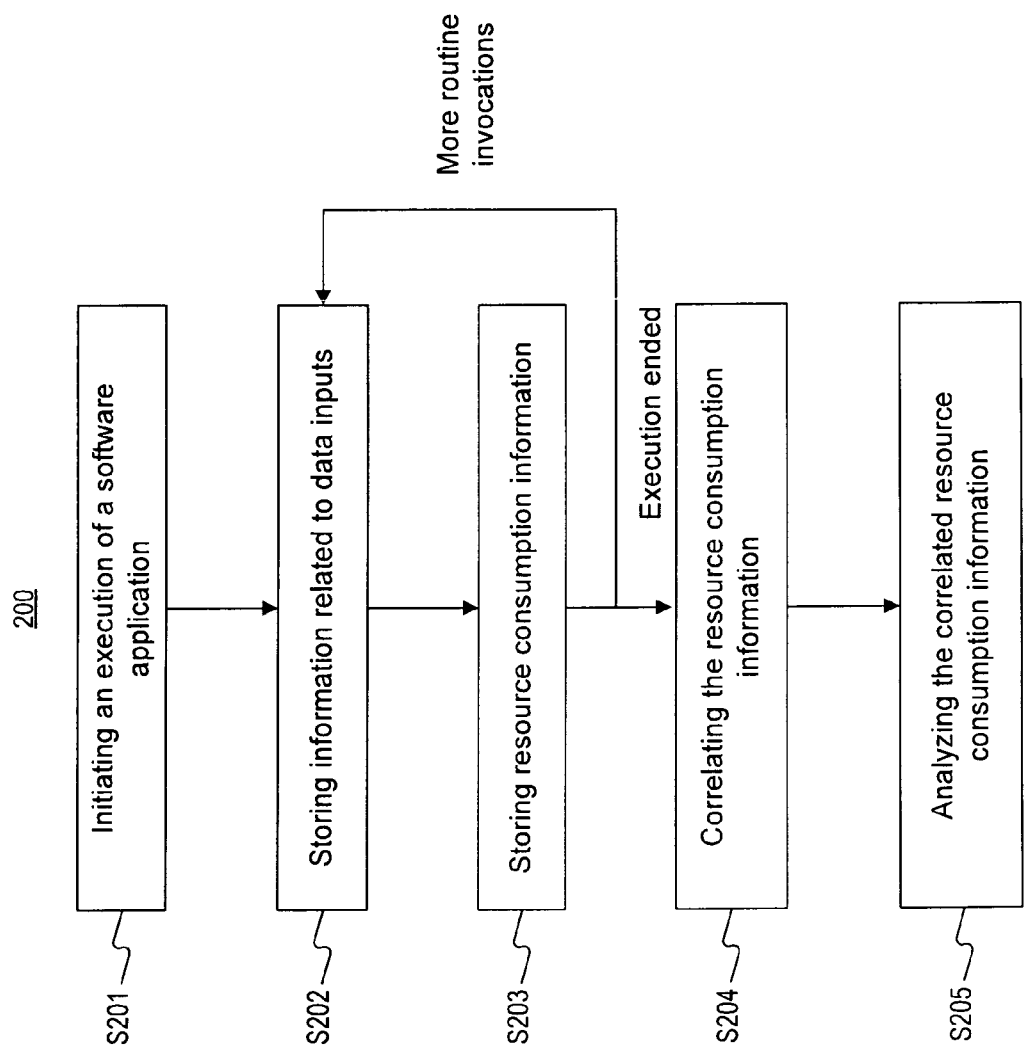
FIG. 2 is a flowchart of an exemplary profiling method, consistent with an embodiment of the invention.

FIG. 2 is an exemplary flowchart of a profiling method 200, consistent with an embodiment of the invention. In some embodiments, method 200 may be performed by enhanced profiler 112.

As shown in FIG. 2, the method starts at step S201 by initiating an execution of application under test 111. Application under test 111 may include a number of routines that run on processor 101 at various times during the execution. For each routine invoked by application under test 111, enhanced profiler 112 will store certain information in execution logs 121, as discussed below with respect to steps S202 and S203.

Figure 3:
FIG. 3 illustrates an exemplary data structure, consistent with certain aspects of the invention.

At step S202, enhanced profiler 112 may store information related to any data inputs to the various routines in application under test 111. In some embodiments, enhanced profiler 112 simply stores the size of the data inputs to the routines in execution log database 121. In other embodiments, enhanced profiler 112 stores parameters input to a routine when it is called. FIG. 3 illustrates an exemplary execution log 300 that may be stored in execution log database 121.

Execution log 300 may include a call hierarchy column 303 reflecting the names of the various routines included in application under test 111. Call hierarchy column 303 may include the name of each routine invoked by application under test 111. Enhanced profiler 112 may store the size for the data inputs to each routine in input size column 304. For example, if a routine "main" has a single argument that is an integer of 100 used as a loop counter, enhanced profiler 112 will store an entry in input size column 304 of "100" for the call to "main."

The method may then move to step S203, where enhanced profiler 111 may store resource consumption information for the routine in execution log 300. For example, enhanced profiler 111 can store processor usage time in microseconds, in net time column 301. As shown in FIG. 3, the call to "main" took a net time of 1 microsecond. Note that column 301 reflects the net time used by "main." If main was running for the entire execution of application under test 111, the total runtime for main might be very long, such as an hour. However, net time column 301 only includes the actual time spent executing code for main, e.g. 1 microsecond. The remaining part of the hour, spent in routines invoked by main, does not count toward the net time.

At step S203, enhanced profiler 111 can store other types of resource consumption information, such as memory usage information. Enhanced profiler 111 can store memory usage information in net stack usage column 302. In this case, main used 10 kb of stack space, as shown in the first row of execution log 300.

As shown in FIG. 2, steps 202 and 203 can be implemented for each routine called during the execution of application under test 111. As long as application under test 111 is still running, method 200 will return to step 202 and 203 for each routine invocation and make new entries in execution log 300.

In our example, routine "main" makes several calls to a routine named "sub1." In turn, "sub.1" makes several calls to a routine named "sub2." The calling relationship is illustrated in calling hierarchy column 303 by indenting each called routine underneath the calling routine. Each time an entry is made in steps S202 and S203, the entry is appended to the bottom of execution log 300. Thus, execution log 300 is a chronological description of the routine calls made during the execution of application under test 111.

Thus, as shown in FIG. 3, the second routine call in the execution is a call from routine main to routine sub1. For the purposes of this example, assume that all input sizes to sub1, sub2, and main simply reflect a loop variable that is input as a single integer argument when the routine is called. At step S202, data logger 113 creates the second row in execution log 300 to reflect the call to sub1, along with an input size of 3. At step S303, data logger 113 stores a net time of 12 microseconds and a net stack usage of 27 kb in the second row of execution log 300.

Similarly, the third routine call in the execution is a call from routine sub1 to sub2. At steps S202 and S203, data logger 113 stores information in the third row of execution log 300 indicating that the input size for this routine call was 5, the net time spent in sub2 was 12.5 microseconds, and the net stack usage for sub2 was about 24 kb.

Note that subsequent calls to sub1 and sub2 do not necessarily have the same runtimes or input sizes. For example, the fourth row of execution log 300 indicates sub1 was called with an input size of 6, and took 12 microseconds and 108 kb of stack space. Similarly, the fifth row of execution log 300 indicates that sub2 was called with an input size of 9, and took 40.5 microseconds and approximately 59 kb of stack space.

Once the execution of application under test 111 ends, no further data is logged and the method moves to step S204. At step S204, inference engine 114 correlates the stored resource consumption information to the input sizes to determine those routines exhibiting inefficient resource consumption. As used herein, "inefficient' resource consumption may broadly refer to any use of resources that may meet certain criteria, whether the resource consumption is actually efficient or not. Resource consumption for a given routine may be characterized as inefficient by comparing the resource consumption to criteria such as user-defined thresholds. Resource consumption for a given routine can also be characterized by comparing the resource consumption of the routine to the resource consumption of other routines. Inference engine 114 may, for example, analyze the stored resource consumption information by correlating the resource consumption information, e.g. the stored values in columns 301 and 302, to the stored input sizes in column 304.

Figure 4:
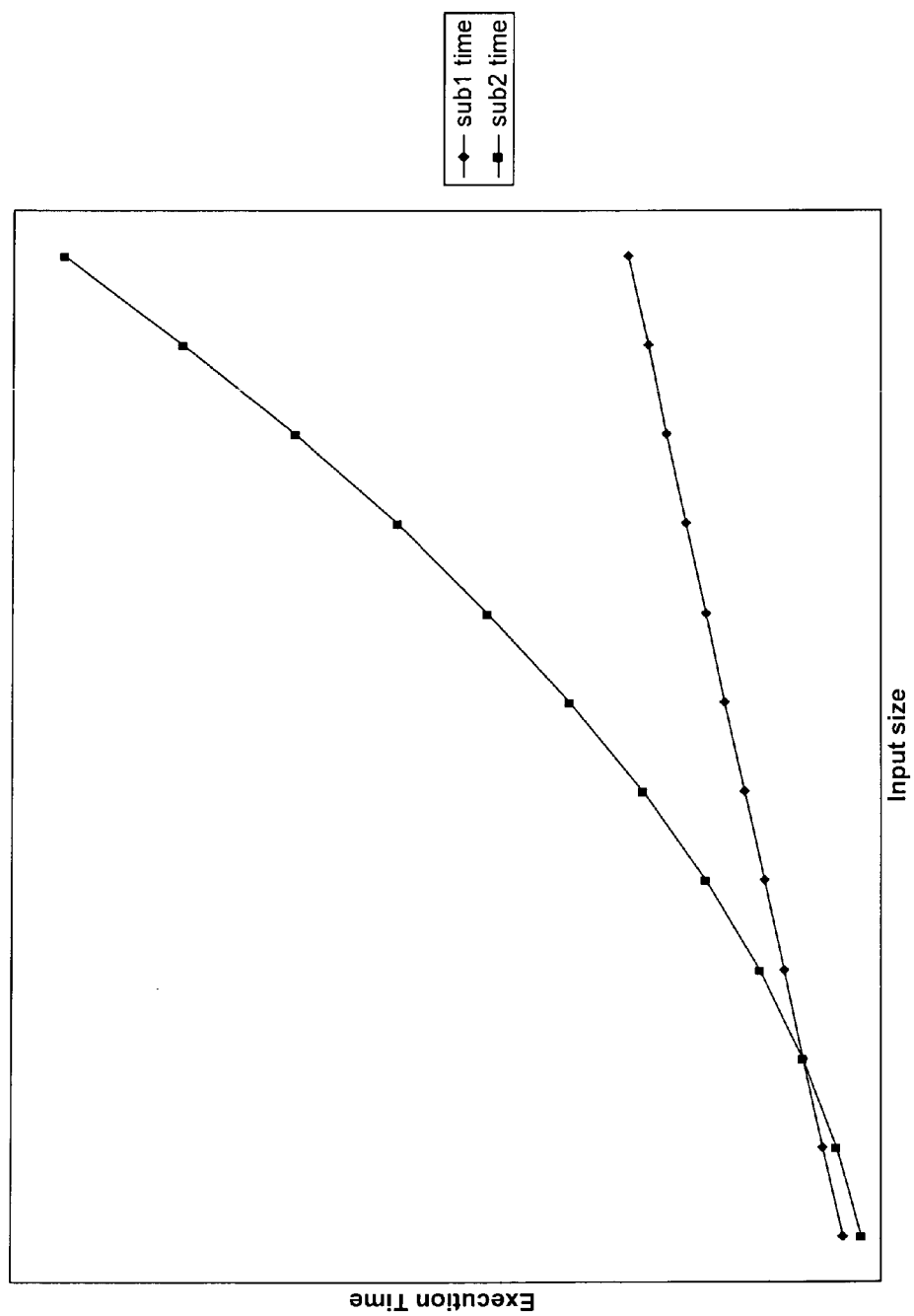
FIG. 4 illustrates an exemplary profile graph, consistent with certain embodiments of the invention.

FIG. 4 illustrates a graph 400 representing execution times vs. input sizes ("n") for routines sub1 and sub2. As shown in graph 400, the runtime of sub1 has a linear relationship with n. In contrast, the runtime of sub2 increases with $n^2$ for sub2. Inference engine 114 may correlate the resource consumption information (step S204) by using regression analysis or empirical function discovery techniques on the data for each routine. Using such techniques, inference engine 114 may estimate a function such as 2n for the runtime of sub1, and $0.5 n^2$ for the runtime of sub2. Thus, the estimated function for sub1 runtime indicates the linear relationship to the input size, and the estimated function for sub2 runtime indicates the $n^2$ relationship to the input size.

Figure 5:
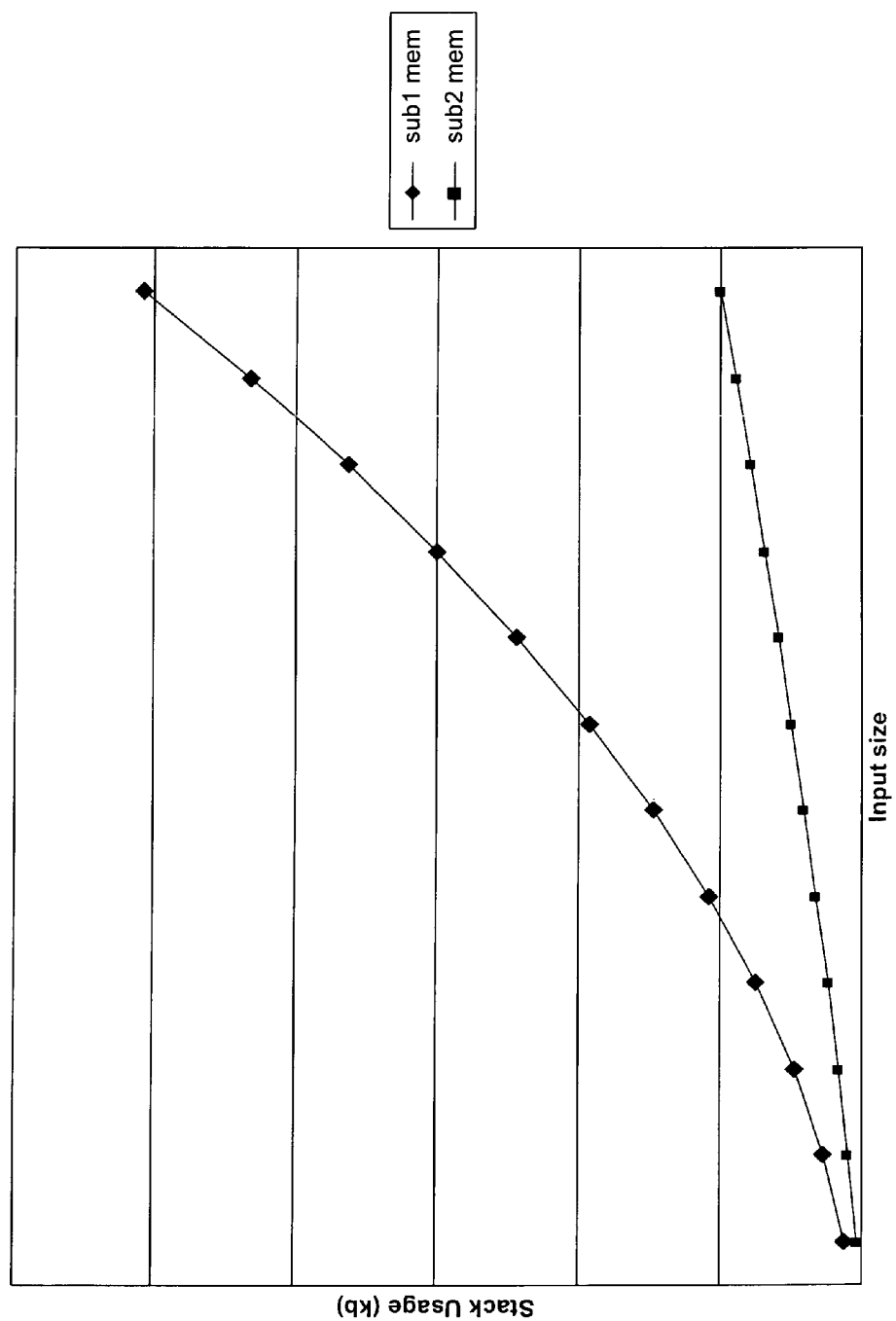
FIG. 5 illustrates an exemplary profile graph, consistent with certain embodiments of the invention.

FIG. 5 illustrates a graph 500 representing stack usage vs. input sizes for routines sub1 and sub2. As shown in graph 500, the stack usage of sub1 has an $n^2$ relationship to the input size, whereas sub2 has an n log n relationship to the input size. The regression analysis or empirical function discovery at step S204 will provide these relationships as well, for example by estimating a function of $3*n^2$ for the stack usage of sub1, and 3*n log n for the memory usage of sub2. Thus, the estimated function for sub1 stack usage indicates the $n^2$ relationship to the input size, and the estimated function for sub2 stack usage indicates the n log n relationship to the input size. In some embodiments, the functions estimated at step S204 for memory stack and runtime will have more than one term, e.g., $k*n^2+hn+i$, where k, h, and i are constants.

At step S205, as described above, inference engine 114 can analyze the correlated resource information to determine a subset of the routines that exhibit inefficient resource consumption. In some embodiments, inference engine 114 will use a predetermined threshold to determine the subset. For example, inference engine 114 may use a predetermined threshold of $n^2$ for runtime analysis, meaning any routines with a term of order of $n^2$ or higher will be considered an inefficient routine.

In embodiments where the functions estimated in step S204 contain multiple terms, inference engine 114 may consider only the highest-order term, and may also ignore the constants. Inference engine 114 may thus perform, effectively, an empirical "Big O" algorithmic analysis, known to those skilled in the art, on the data in execution logs 121, and categorize routines with estimated runtime functions of $n^2$ or greater as inefficient. Thus, since sub1 is to be relatively efficient for large input sizes as shown by the linear relationship shown in FIG. 4, inference engine 114 may not categorize sub1 as exhibiting inefficient runtime performance. However, sub2 may trigger the threshold and be categorized by inference engine 114 as inefficient, due to the $n^2$ relationship shown in FIG. 4. Thus, inference engine 114 may categorize sub2 as exhibiting inefficient runtime behavior.

Considering stack usage, inference engine 114 may also use $n^2$ as the threshold. In one implementation, inference engine 114 will thus determine that sub2 is relatively efficient for large input sizes because of the n log n relationship, whereas sub1 is relatively inefficient due to the $n^2$ relationship. Thus, inference engine 114 can categorize sub1 as exhibiting inefficient stack consumption as the size of inputs to sub1 increases.

Manual Test Cases

In the discussion above, it was assumed that application under test 111 was simply initiated and monitored for enough time to develop data for analysis by inference engine 114. By simply allowing application under test 111 to run under normal circumstances, enough data may be gathered to effectively evaluate each routine.

However, system 100 may also be used to evaluate predefined test cases. In such embodiments, application under test 111 can be executed for each predefined test case. This can be accomplished by performing steps S202 and S203 of method 200 for each test case.

By allowing a user of system 100 to determine a predefined set of test cases, the user can perform more controlled and more directed testing of application under test 111. For example, if the user suspects a certain routine might exhibit inefficient behavior under such circumstances, the user can tailor the test cases to these circumstances. In such embodiments, enhanced profiler 112 can help confirm the user's suspicions about the performance of one or more routines in application under test 111.

Function Discovery

As discussed, at step S204 of method 200, inference engine 114 can estimate a function to describe the resource consumption of the various routines in application under test 111. Techniques such as regression and empirical function discovery can be used at step S204. In particular, input sizes can be considered as one or more independent variables, and resource consumption such as stack usage or runtime can be considered as dependent variables.

One empirical function discovery application that can be incorporated into inference engine 114 is the BACON system, described in "Readings in Machine Learning" by Jude Shavlik et al. (editors) (Morgan Kaufmann Publishers, 1990, pages 356-372) ("reference 1") and "Data-driven approaches to empirical discovery" by Langley et al. (Artificial Intelligence, 40: 283-312, 1989) (reference 2), both of which are incorporated herein by reference. The BACON system can estimate both polynomial and logarithmic functions to describe relationships in input data. Reference 2 also describes other suitable empirical function discovery systems such as FAHRENHEIT and IDS.

In some embodiments, system 100 may include an empirical function discovery system which will not only estimate the functions to describe resource consumption of particular routines, but which may also specify the independent variables. In such embodiments, inference engine 114 may automatically generate a series of test cases based on the specified independent variables. For example, if the empirical function discovery system specified an independent variable of "100," inference engine 114 could automatically generate a test case corresponding to an input size of 100 for one or more of the routines in application under test 111.

User-Selectable Thresholds

Figure 6:
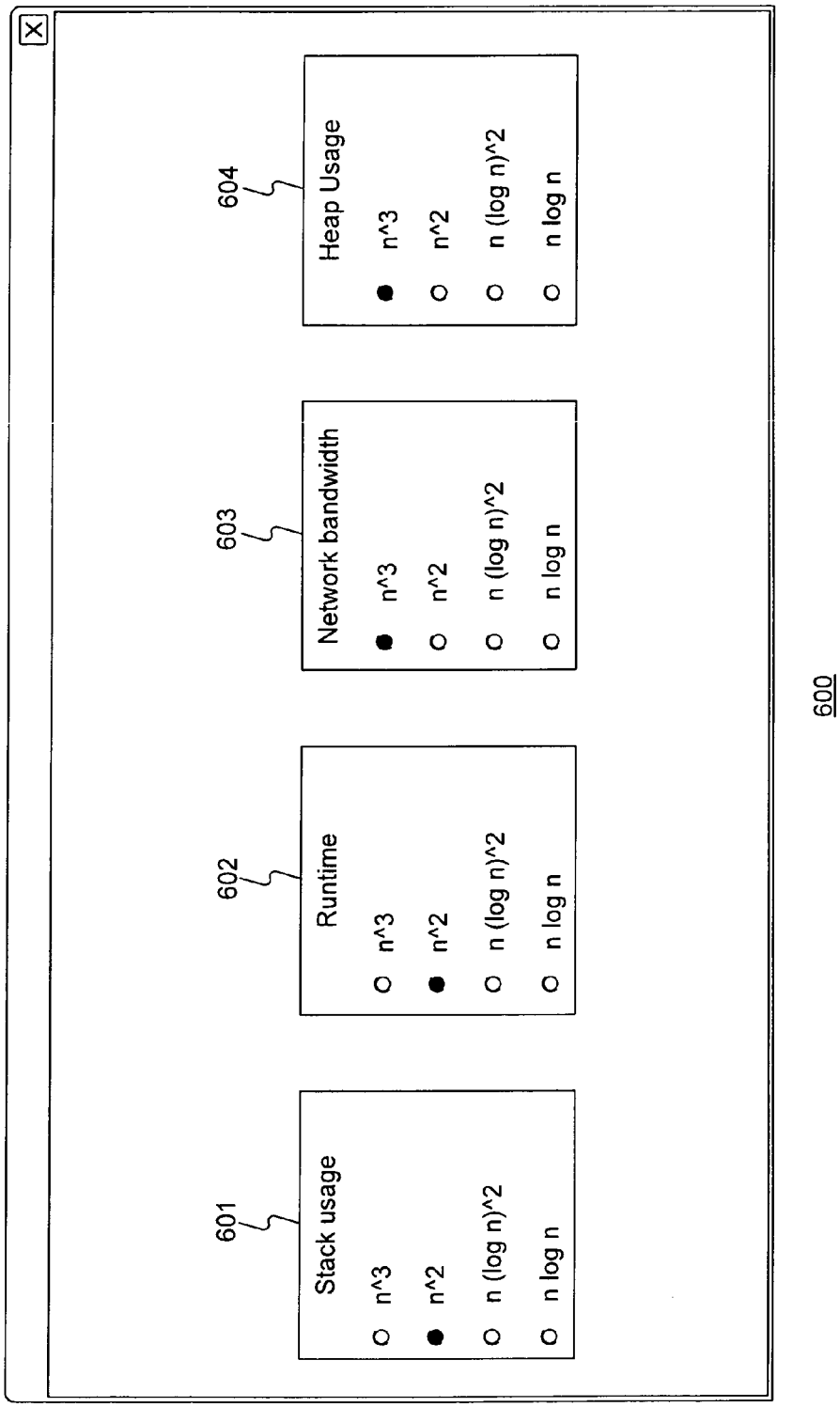
FIG. 6 illustrates an exemplary user interface for a profiling system, consistent with certain embodiments of the invention.

In some embodiments, users may be given the option to define the thresholds that may be used at step S205 on a resource-by-resource basis. For example, as shown in FIG. 6, profiling terminal 100 may display a threshold selection window 600. Selection threshold window 600 may include threshold settings for resources such as stack usage threshold 601, runtime threshold 602, network bandwidth threshold 603, and heap usage threshold 604. As shown in FIG. 6, the user may use radio buttons or selection buttons to set thresholds 601-604 independently for each resource type.

Thus, in the example discussed above, the user could have selected "n log n" as the threshold for stack usage 601. Since sub2 exhibited n log n behavior on the stack, inference engine 114 would also have characterized sub2 as inefficient at step S205 had the user selected this option. On the other hand, if the user had selected n^3, inference engine 114 would have not have characterized either sub1 or sub2 as inefficient for stack usage.

On the other hand, if the user had selected n log n as runtime threshold 602, the result of step S205 would have been the same—sub1's linear runtime would still not trigger the threshold, and sub2's n^2 runtime would still trigger the threshold. Thus, inference engine 114 would only characterize sub2 as inefficient. On the other hand, if the user selected n^3, inference engine 114 would not have characterized either sub1 or sub2 as inefficient for runtime.

Identifying the Size of Data Inputs

In the example described above, it was assumed that each argument to the routines main, sub1, and sub2 was a simple loop counter representing the size of the input data for the routine call. Thus, the input size was known beforehand and could be directly instrumented to execution logs 121. However, in many cases there will be more than one argument to each routine, and it will not be apparent at runtime which argument actually represents the input size.

One solution is to instrument information for each argument. For example, consider a routine sub3, that takes an array of float values and multiplies each term by a scalar value such as an integer. Most implementations of such a routine would exhibit linear runtime behavior and linear stack usage, based on the size of the array. By instrumenting both arguments at step S202, data logger 113 may store information from which the input size could be subsequently derived by inference engine 114. At step S204, inference engine 114 could try correlating both input values to runtime and memory usage.

In doing so, inference engine 114 may find that the integer multiplier has very little effect on the runtime of sub3. On the other hand, the linear relationship with the size of the array may be quite clear. Thus, inference engine 114 could simply determine that the input size is based on the instrumented variable with the biggest effect on resource consumption, e.g. the array size.

This example assumes it is possible to directly instrument an array size. In a language such as Java, array sizes are readily available. Thus, in a Java implementation, data logger 113 could simply instrument the array length field. In such embodiments, it may not even be necessary to instrument the array itself, but rather to simply instrument the size of input data objects such as arrays.

Other languages, such as the C programming language, do not have a predefined array data type with a length field. In many cases, software developers may "mark" the end of an array with a particular value, such as a null character. One way to deal with this scenario is to simply instrument the whole input array. The input size can be ascertained later, by iterating over the array and searching for the terminating value.

Of course, instrumenting each array requires substantially more data to be instrumented than in the case of the Java implementation discussed above. Another technique would be to require the software engineer to embed some information in each routine they wish to have evaluated, to help enhanced profiler 112 ascertain the input sizes. For example, a global variable could be defined, such as INPUT_SIZE, and each routine could be set this variable to "−1" at the start of the routine and to the actual input size during the runtime of the routine. INPUT_SIZE could be instrumented for each call to each routine, and correlated to the stored resource consumption information.

Those skilled in the art will recognize that, in the case of C language, it may be useful to use precompiler directives each time such a global variable is referenced. For example, a precompiler directive "#define INSTRUMENT_INPUT_SIZE" could be used to turn on/off setting the global INPUT_SIZE variable. The definition of INPUT_SIZE and each operation on INPUT_SIZE could be bracketed with "#ifdef INSTRUMENT_INPUT_SIZE" and "#endif." In this manner, developers could turn on and off the global variable and associated operations simply by choosing whether to comment out the "#define" statement.

Input Size as a Function of Two or More Arguments

Consider a routine that takes two arguments, an outer loop counter i and an inner loop counter j. Thus, the inner loop will execute a total of i*j times. In this case, neither i nor j will be sufficient to correlate to the runtime of the routine. However, at step S204, inference engine 114 will estimate a function including the term i*j. Inference engine 114 may simply treat any input argument as "n" for the purposes of categorizing a routine. Thus, if i==j==n, i*j==n^2, and the runtime of this routine can be treated as a function of the square of the input size.

Similarly, assume inference engine 114 estimated a function with a logarithmic term for one input variable and a linear term for another variable, e.g., i log j. Inference engine 114 could simply categorize the routine as an n log n routine for the purposes of evaluating its efficiency.

Heap Usage

In the embodiments discussed above, it was assumed that memory usage of a given subroutine could be defined simply by looking at the stack. In many cases, this will provide an accurate indication of how much memory is being used by a routine. For example, if a C routine sub4 takes both an array and the array size n as input arguments, and doesn't use much stack space on its own, the memory usage of the routine will be almost entirely comprised of the array on the stack. Therefore, inference engine 114 will characterize the memory usage of sub4 as linear with the array size n at step S204.

However, assume instead that routine sub4 takes a pointer rather than an array as the first argument, along with the integer array size. Further, assume sub4 calls the "malloc"

routine and allocates memory off the heap, using $n^2$ as the size argument to the malloc call. In this case, inference engine 114 will not be able to tell that sub4 is using memory on the order of $n^2$ simply by looking at the stack usage. Thus, in some embodiments it is also useful to instrument heap usage and identify routines that use the heap inefficiently.

Outputting Results

In some embodiments, inference engine 114 may output a list of routines and their classifications for a given execution. For example, as shown in FIG. 7, inference engine 114 may display an output table 700. Output table 700 includes the names of the routines that are called by application under test 111.

As shown in FIG. 7, the rows of output table 700 are categorized into different efficiency categories or bins 701-705. Each routine is categorized by its asymptotic behavior as determined by inference engine 114 at step S204. Each bin corresponds to a grouping defined by the highest order term calculated by inference engine 114. For example, bin 701 corresponds to all estimated functions with a high order term of $n^3$ or higher.

Thus, by viewing output table 700, a developer can instantly see that routines sub17 and sub14 exhibited runtimes that were higher than $n^3$. For example, sub3 may have exhibited runtime behavior of $n^3$, whereas sub14 may have exhibited runtime behavior of $(n^3)((\log n)^2)$. In some embodiments, rather than creating bins such as 701-705, inference engine 114 will simply list each routine in decreasing order by the highest-order term. However, if there are many different potential categorizations for routines, it may be easier to use bins rather than displaying the highest-order term estimated for each routine.

Note that table 700 can reflect the categorization of each routine in various resource categories. For example, routine sub17 appears in bin 701 for both stack usage and heap usage, suggesting inefficient usage of both types of memory. Routine sub5 appears in bin 705 for both network bandwidth and heap usage, and thus appears to be using these resources relatively efficiently.

As previously discussed, a user can set selectable thresholds in threshold window 600. In some embodiments, output table 700 will highlight the routines that exceed the defined threshold for each resource type. Assume the user set stack usage threshold 601 and runtime threshold 602 to $n^2$, and set network bandwidth threshold 603 and heap usage threshold 604 to $n^3$. In this case, for stack usage and runtime, output table 700 will highlight all of the routines in bins 1 or 2, as shown in bold italic. If the user sets network bandwidth threshold 603 and heap usage threshold 604 to $n^3$, only the routines in bin 1 will be highlighted for these resources.

CONCLUSION

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described as being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing applications, such as e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method comprising:
   initiating, by a processor, an execution of a software application, the software application comprising a plurality of routines;
   storing, by the processor, information related to data inputs to the plurality of routines during the execution of the software application;
   storing, by the processor, resource consumption information for the plurality of routines during the execution of the software application;
   instrumenting, by the processor, arguments associated with the data inputs;
   deriving, by the processor, a size of data inputs based on the instrumented arguments;
   correlating, by the processor, the resource consumption information to the derived size of data inputs by estimating a plurality of functions each describing a relationship between the resource consumption information and the derived size of data inputs of each of the plurality of routines;
   comparing, by the processor, the correlated resource consumption information for the plurality of routines to a plurality of threshold values corresponding to categories of resource usage; and
   determining, by the processor, based on the comparison of the correlated resource consumption information and the plurality of threshold values, a subset of the plurality of routines that meet or exceed one or more of the plurality of threshold values, the subset of routines corresponding to routines exhibiting inefficient resource usage.

2. The method according to claim 1, wherein the resource consumption information comprises runtime information for the plurality of routines.

3. The method according to claim 1, wherein the resource consumption information comprises memory usage information for the plurality of routines.

4. The method according to claim 1, further comprising:
sorting the subset of routines based on highest-order terms of the plurality of functions each describing the relationship between the resource consumption information and the derived size of data inputs of each of the plurality of routines; and
displaying the subset according to a result of the sorting.

5. The method according to claim 2, further comprising receiving information specifying the threshold.

6. A non-transitory computer-readable medium including instructions for causing a processor to execute a method comprising:
initiating an execution of a software application, the software application comprising a plurality of routines;
storing information related to data inputs to the plurality of routines during the execution of the software application;
storing resource consumption information for the plurality of routines during the execution of the software application;
instrumenting arguments associated with the data inputs;
deriving a size of data inputs based on the instrumented arguments;
correlating the resource consumption information for the plurality of routines to the derived size of data inputs by estimating a plurality of functions each describing a relationship between the resource consumption information and the derived size of data inputs of each of the plurality of routines;
comparing the correlated resource consumption information for the plurality of routines to a plurality of threshold values corresponding to categories of resource usage; and
determining, based on the comparison of the correlated resource consumption information and the plurality of threshold values, a subset of the plurality of routines that meet or exceed one or more of the plurality of threshold values, the subset of routines corresponding to routines exhibiting inefficient resource usage.

7. The non-transitory computer-readable medium according to claim 6, wherein the resource consumption information comprises runtime information for the plurality of routines.

8. The non-transitory computer-readable medium according to claim 6, wherein the resource consumption information comprises memory usage information for the plurality of routines.

9. The non-transitory computer-readable medium according to claim 6, wherein the method further comprises:
sorting the subset of routines based on highest-order terms of the plurality of functions each describing the resource consumption information and the derived size of data inputs of each of the plurality of routines; and
displaying the subset according to a result of the sorting.

10. The non-transitory computer-readable medium according to claim 7, the method further comprising receiving information specifying the threshold.

11. A system comprising:
a processor configured to:
store information related to data inputs to a plurality of routines of a software application during an execution of the software application;
store resource consumption information for the plurality of routines during the execution of the software application;
instrument arguments associated with the data inputs;
derive a size of data inputs based on the instrumented arguments;
correlate the resource consumption information for the plurality of routines to the derived size of data inputs by estimating a plurality of functions each describing a relationship between the resource consumption information and the derived size of data inputs of each of the plurality of routines;
compare the correlated resource consumption information for the plurality of routines to a plurality of threshold values corresponding to categories of resource usage; and
determine, based on the comparison of the correlated resource consumption information and the plurality of threshold values, a subset of the plurality of routines that meet or exceed one or more of the plurality of threshold values, the subset of routines corresponding to routines exhibiting inefficient resource usage.

12. The system according to claim 11, wherein the resource consumption information comprises runtime information for the plurality of routines.

13. The system according to claim 11, wherein the resource consumption information comprises memory usage information for the plurality of routines.

14. The system according to claim 11, the processor being further configured to:
sort the subset of routines based on highest-order terms of the plurality of functions each describing the relationship between the resource consumption information and the derived size of data inputs of each of the plurality of routines; and
display the subset according to a result of the sorting.

15. The system according to claim 11, the processor being further configured to receive information specifying the threshold.

16. The method according to claim 1, further comprising:
automatically generating a test case corresponding to the derived size of data inputs.

17. The system according to claim 11, the processor being further configured to:
automatically generate a test case corresponding to the derived size of data inputs.

* * * * *